3,401,219
MORAXELLA BOVIS INFECTIOUS BOVINE KERATOCONJUNCTIVITIS STEAM-KILLED BACTERIN
Alexander Zeissig, Mountainside, N.J., assignor to Merck & Co., Inc., Rahway, N.J., a corporation of New Jersey
No Drawing. Filed Aug. 25, 1965, Ser. No. 482,592
5 Claims. (Cl. 424—92)

This invention relates to immunizing agents and particularly to a bacterin which is useful as a prophylactic agent against infectious keratoconjunctivitis. The invention includes both the method of making the bacterin and bacterin itself as a product.

The eye disease of cattle known as infectious keratoconjunctivitis is commonly called "pink eye." It is an acute to chronic inflammation of the eye which may result in extensive ulceration. It is a serious disease as it destroys the eyesight, partially or fully, and make it difficult or impossible for the animal to find food. It attacks cattle of all ages. Since it is very contagious it spreads rapidly through a herd. It may attack eighty percent of the cattle, this causing enormous financial loss to the herd owner.

The causative organism is generally recognized as the bacterium *Moraxella bovis*. Bergey's Manual describes it as a discrete, short, plump diplo-bacillus with rounded ends, measuring 0.5 to 1.0 u. It is Gram-negative, does not form endospores and is non-motile. Both smooth and rough types of colonies have been observed when organisms obtained from infected eyes are grown on culture media in the laboratory. The smooth-appearing variant has been identified as the one which transmits the infection. It is known that a vaccine can be made by cultivating the smooth strain of *Moraxella bovis*, recovering the growth from the culture media, killing it, diluting it and filling the suspension into ampules for use as an antigen. The present invention follows, in general, these techniques but a special feature is the selection of a strain of *Moraxella bovis* which yields a heat-stable specific antigen. This specific antigen has been found to be present only in a sample of *Moraxella bovis* freshly obtained from an afflicted eye, or which has had, at most, one or two serial transfers on laboratory culture media. This thermostable antigen is the essential immunizing agent.

The seed which is used for incubation in the culture medium must therefore be a strain of *Moraxella bovis* which possesses such a thermostable specific antigen. As a further feature of the invention, the suspension of harvested organisms are subjected to the temperature of flowing steam. This serves to kill the bacteria and denature the protein. As the antigen is thermostable it survives this heating without impairment of its immunizing properties. Indeed, the heat treatment makes a more effective immunizing agents of the specific thermostable antigen and this is believed to be due to the fact that the steam denaturization of the labile proteins which are present converts this heat-stable specific antigen into a more effective immunizing agent.

A vaccine is made from this antigen by the usual standardizing and packaging techniques. These procedures are well known in the art.

The culture medium may be any of the conventional ones adequate for growing the organism, however, the tryptose phosphate agar sold by Difco Laboratories, to which defibrinated ox blood has ben added, is preferred. The ox blood content is preferably about 5% but it may be within the range of 2 to 10%. Other suitable culture media are a Bordet-Gengou potato glycering agar containing added bovine blood, and the conventional nutrient agar plus blood.

The culture medium should be autoclaved before use to sterilize it. It is then placed in a culture bottle such as a Blake or Povitsky bottle, so that it will present a large surface. The inoculation of the culture medium may be accomplished by swabbing or flowing but preferably by nebulizing the suspended seed culture onto the surface of the culture medium. Nebulization is advantageous because it cuts down the time of inoculation, and has been found to produce the most abundant growth. Moreover, this nebulization tends to overcome any tendency of the bacteria to undergo transformation to the rough type culture. The amount of suspended seed culture introduced onto the culture medium follows normal practice.

The culture medium, thus inoculated with the suspended smooth colonies of *Moraxella bovis*, is then incubated. This incubation may range from about eighteen hours up to about seventy-two hours at a temperature range from about 25° C. to about 45° C. Very good results have been obtained by incubating the culture medium with the suspended smooth colonies at a temperature of 37° C. for twenty-four hours.

After incubation, the growth is dislodged from the culture medium, by scraping or by agitation of the surface with glass beads while the bottle is rocked. The growth is then removed. This is most readily accomplished by adding distilled water as wash water and removing it. The cells of the harvested growth are preferably sedimented by centrifugation and resuspended in a moderate amount of a suitable suspending medium, such as distilled or double distilled water or a salt solution containing up to about 0.02% sodium chloride. It should be noted that it is not necessary that the suspending medium used in this operation be the same as that subsequently used in making the final suspension for use.

To kill the organisms and denature the protein component, the suspension is exposed to flowing steam for a period of about one hour. During this time the container for the suspension is slightly agitated to bring the organism into direct contact with the live steam. The time may be shortened or extended by fifteen minutes but too short a time may not result in complete killing and too long a time may destroy some of the antigen.

The resulting suspension is diluted so that each milliliter will contain approximately two billion cells as determined by a conventional counting chamber. About 5 ml. of this suspension is used as the dose of vaccine for each animal. The suspension may be lyophilized so that it will better withstand storage.

The following specific example illustrates the preparation of a vaccine according to the invention.

EXAMPLE 1

Five one liter Blake bottles were used in the preparation of the bacterin. A tryptose-phosphate agar (Difco) containing 5% defibrinated bovine blood was added to the bottles which were lying on their sides, to a depth of one-half inch.

The strain of *Moraxella bovis* used in the preparation of the bacterin was freshly obtained from an eye positively identified as being afflicted with this disease. It was suspended in 3 ml. of double distilled water to give a concentration of 500 to one billion bacterial cells per ml. This suspension was carefully sprayed over the surface of the medium in the culture bottle.

The bacteria were harvested after incubation at 38° C. for thirty hours. Collection of the growth was carried out by the use of metal rakes to remove the growth from the surface of the medium. Twenty ml. of 0.02% sodium chloride solution was added to each culture bottle to aid in removing the growth from the culture medium. Pipettes were used to remove the growth from the bottle to a collecting flask.

After the collection of the growth from the culture bottles the collecting flask was centrifuged. The supernatant fluid was poured off leaving the growth in the flask. The growth in the flask was weighed and resuspended in 0.02% sodium solution by adding 10 ml. of this solution for each gram of bacterin or vaccine cells of *Moraxella bovis.*

This suspension was poured into open Petri dishes which were then placed in a conduit through which steam can be passed. The conduit should be connected to a mechanical agitating mechanism so that the Petri dishes are slowly rocked. Live steam is flowed through the conduit so that it moves along rapidly. This treatment is continued for one hour.

A sample is then taken and the bacteria counted. The vaccine is further diluted so that each milliliter contains 2 billion bacteria. In adult cattle, 5 ml. containing 2 billion bacteria per milliliter giving a total of 10 billion cells will give adequate protection against the disease for six months as determined by challenge. Calves 2 weeks to 6 months should have one 5 ml. injection followed by another 5 ml. injection in 14 days.

Effective protection may be achieved with a unit dosage of as low a concentration as two billion organisms. However, as much as sixteen billion organisms may be administered as a dose. This may be accomplished by regulating the concentration of cells in the bacterin or by the volume of bacterin administered, or both.

What is claimed is:

1. A process of making a vaccine to immunize cattle against infectious keratoconjunctivitis by inoculating a culture medium with a smooth colony of *Moraxella bovis* which has been freshly obtained from an afflicted eye or has not undergone more than two serial passages of cultivation, incubating the culture medium until a growth is obtained, harvesting the growth, killing the growth and denaturing the protein by contact with live steam thereby rendering the thermostable specific antigen immunologically active and suspending the killed organisms in a liquid medium to form a vaccine.

2. The method of claim 1 wherein the culture medium is a tryptose-phosphate agar containing blood cells and the incubation is for a period of from eighteen hours to about seventy-two hours at a temperature of from 25° C. to 45° C.

3. The method of claim 1 wherein the culture medium is tryptose-phosphate agar containing blood cells and the incubation is for a period of twenty-four hours at a temperature of 37° C.

4. The method of claim 1 where the suspending medium contains up to about 0.02% of weight of sodium chloride.

5. A bacterin for immunizing cattle against bovine keratoconjunctivitis comprising a stable liquid mixture containing as one component, a suspension of at least 2,000 million killed smooth *Moraxella bovis* organisms, the organisms having been selected from a fresh source such as an afflicted eye, or a cultivation which has not had more than two serial passages, cultivated on a blood-agar medium, harvested from the medium, suspended in an aqueous diluent and killed with open steam, the treated organisms having been rendered immunologically more active by this process.

References Cited

UNITED STATES PATENTS 3,197,373 7/1965 Jackson ............... 167—78

OTHER REFERENCES

"What causes pink eye in cattle" Agric. Res. Wash. 14(3) p. 13, 1965.

Griffin et al. Vet. Rec. 77:1056–1057 (1965) "Infectious kerato-conjunctivitis in cattle."

Gleeson et al., Irish Vet. J. 19:163–182(1965) "A study of infectious kerato-conjunctivitis (I.K.C.)."

Hughes et al., Am. J. Vet. Res. 26:1331–1338 (1965) "Ultra-violet radiation and *Moraxella bovis* in the etiology of bovine infectious kerato-conjunctivitis."

Steve et al., J. Econ. Ent. 58:444–446 (1965) "Investigations on the tranmissability of *Moraxella bovis* by the face fly."

Henson et al., Cornell Vet. 51:267–284 (1961) "Infectious bovine keratoconjunctivitis III Demonstration of toxins in *Moraxella* (Hemophilus) *bovis* cultures."

Adinarayanan et al., Vet. Rec. 73:694–696 (1961) "Infectious bovine keratitis with special reference to isolation of *Moraxella bovis.*"

LEWIS GOTTS, *Primary Examiner.*

SHEP K. ROSE, *Examiner.*